Patented Oct. 16, 1951

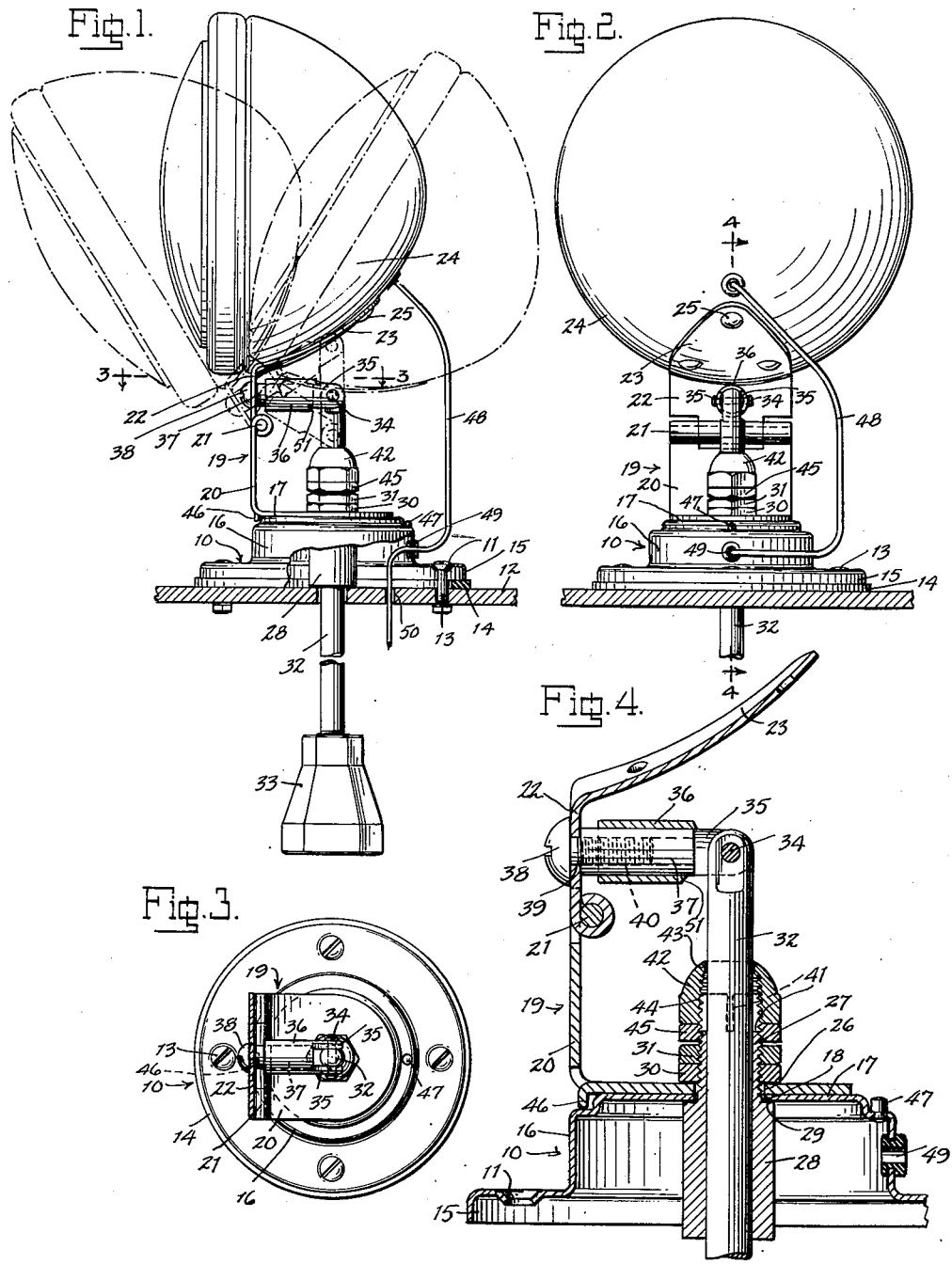

2,571,950

UNITED STATES PATENT OFFICE 2,571,950

DIRIGIBLE SEARCHLIGHT FOR ATTACHMENT TO CAB ROOFS AND THE LIKE

Frederick Sauer, Fairfield, Conn., assignor to The Kilborn-Sauer Company, Fairfield, Conn., a corporation of Connecticut Application February 7, 1949, Serial No. 74,925

1 Claim. (Cl. 240—61.13)

The present invention relates to a dirigible searchlight, particularly for attachment to the roof of an automobile, service truck, boat cabin or the like, to be operated from the inside thereof for directional and angular control of the searchlight beam. An object of the invention is to provide a searchlight unit having improved mechanism for turning the searchlight about horizontal and vertical axes by one-hand operation, it being proposed to provide a manipulating knob or handle arranged to be moved in a vertical direction to impart angular movement to the searchlight and to be turned about its vertical axis to rotate the searchlight through substantially 360°. A further object is to provide a searchlight structure of relatively simple and inexpensive construction, which will be reliable in operation and capable of withstanding the rough usage to which such searchlights are subjected.

With the above and other objects in view an embodiment of the invention is shown in the accompanying drawings, and this embodiment will be hereinafter more fully described with reference thereto, and the invention will be finally pointed out in the claim.

In the drawings:

Fig. 1 is a side elevation of a dirigible searchlight, according to the illustrated exemplary embodiment of the invention, the same being shown mounted upon the roof of a cab or the like, and the dot-and-dash lines showing two positions of angular adjustment.

Fig. 2 is a rear elevation.

Fig. 3 is a horizontal sectional view, taken along the line 3—3 of Fig. 1.

Fig. 4 is a vertical sectional view on an enlarged scale, taken along the line 4—4 of Fig. 2, the lamp unit being removed.

Similar reference characters indicate corresponding parts throughout the several figures of the drawings.

Referring to the drawings the dirigible searchlight, according to the illustrated exemplary embodiment of the invention, comprises a mounting base 10 of hollow form having a series of counter-sunk bolt-receiving holes 11 for attaching to the cab roof 12, or the like, by means of bolts 13, a rubber sealing gasket 14 being disposed between the roof and the rim 15 of the base. The base is provided with a central domed portion 16 having a flat circular top wall 17 provided with a central opening 18, this wall constituting a bearing for the rotary support of the lamp unit, as will presently more fully appear.

The rotary support for the lamp unit comprises a hinged support 19 comprising a lower L-shape strap hinge member 20 connected by a hinge pin 21 to an upper hinge member 22 having a leaf portion 23 curved to conform to the curved surface of the casing of the lamp unit 24 and secured thereto by rivets 25. The horizontal base portion of the lower hinge member 20 is provided with an opening 26 in register with the opening 18 of the mounting base 10, the openings 26 and 18 being engaged by the threaded stud portion 27 of a sleeve member 28 disposed within the mounting base with the annular shoulder 29 at the lower end of the stud portion engaged beneath the top wall of the base. The threaded stud 27 projects upwardly above the base portion of the hinge member 20 and is engaged by a nut 30 disposed above said base portion with sufficient clearance to permit rotation of the sleeve 28 with respect to the mounting base 10, the position of the nut 30 being fixed by means of a lock nut 31.

Within the sleeve 28 there is engaged for vertical sliding movement a cylindrical shaft 32 extending downwardly within the cab or the like, where it is provided at its lower end with a manipulating knob 33, and extending upwardly above the threaded stud 27 where it is pivotally connected at its upper end by means of a pivot pin 34 to a pair of ear extensions 35—35 of a sleeve 36. The sleeve 36 is telescopically engaged by a cylindrical stud 37 rigidly secured to the inner side of the vertical portion of the upper hinge member 22 by means of a screw 38, the shank of which is engaged through a hole 39 in the hinge member and screwed into a threaded passage 40 in the stud.

In the normal position of the searchlight with its beam horizontal the two vertical parts of the hinge structure are in vertical alignment and the telescoping stud 37 and sleeve 36 are horizontally disposed, these latter being at an intermediate position permitting telescoping movement to either increase or decrease the distance between the hinge member 22 and the pivot connection 34, as will presently more fully appear.

The threaded stud 27 extends above the lock nut 31 and at its upper end is provided with a series of vertical slots 41 for the purpose of permitting the upper end of the stud to be compressed about the shaft 32 to establish a sliding friction fit between them. For this purpose a cap nut 42, having an opening 43 in its upper end for sliding engagement of the shaft 32, and provided with an upwardly tapered internal thread 44, is engaged with the upper slotted end of the stud, and whereby as the cap nut is screwed downwardly the upper slotted end of the stud is caused to contract about the shaft 32. Thus the desired degree of frictional engagement with the shaft may be provided to maintain the adjusted position of the shaft while still permitting it to be moved upwardly or downwardly. The adjusted position of the cap nut is fixed by means of a lock nut 45 screwed upon the stud 27 and engaged with the underside of the cap nut.

In order to limit the turning movement of the searchlight with respect to the base 10, the lower hinge member 20 is provided with a downwardly projecting lug 46 and the base member 10 is provided with an upwardly projecting stud 47 disposed in the path of rotation of the lug 46. Thus rotation of the lamp is permitted through approximately 360°, the lug 46 engaging the stud 47 at the completion of a complete turn in one or the other directions. This prevents strain upon the conductor wire 48 which extends from the lamp casing through an opening 49 in the base 10 and thence through an opening 50 in the roof 12 to a suitable source of current.

In operation the angular position of the lamp is adjusted by pushing the shaft 32 upwardly or pulling it downwardly, upward movement causing the lamp to tilt downwardly, as shown by the dot-and-dash lines, and downward movement causing it to tilt upwardly, as shown by the dot-and-dash lines. The downward movement is limited by abutment of the forward end of the sleeve 36 with the inner side of the hinge member 22, and the upward movement is limited by engagement of a shoulder 51 provided upon the sleeve 36 with the side of the shaft 32.

I have illustrated and described a preferred and satisfactory embodiment of the invention, but it will be understood that changes may be made therein, within the spirit and scope thereof as defined in the appended claim.

What is claimed is:

In a dirigible searchlight, a mounting base member having a horizontal top wall provided with an opening, a lamp unit including a casing, a hinged lamp support comprising upper and lower hinge members and a horizontal hinge joint connecting said hinge members for swinging movement of said upper hinge member relative to said lower hinge member, said upper hinge member being rigidly connected at its upper end to said lamp casing and including a normally vertically disposed portion between said casing and said hinge joint, said lower hinge member having a horizontal base portion engaged for rotary movement with said top wall of said base member and provided with an opening in axial register with said central opening of said top wall, a vertical shaft bearing sleeve disposed for rotary movement in said opening of said top wall, a vertical control shaft engaged for vertical sliding movement in said bearing sleeve and extending above and below said bearing sleeve, handle means carried by said shaft below said bearing sleeve for turning said shaft about its vertical axis and for vertically sliding said shaft in said bearing sleeve, and a normally horizontal longitudinally telescoping and transversely rigid operating connection between said upper hinge member and the upper end of said shaft comprising a sleeve member and a stud member slideably engaged in said sleeve member, a horizontal hinge joint pivotally connecting the outer end of one of said connection members to the upper end of said shaft, and a rigid fastening rigidly securing the outer end of the other said members to said normally vertically disposed portion of said upper hinge member.

FREDERICK SAUER.

REFERENCES CITED

The following references are of record in the file of this patent:

UNITED STATES PATENTS

| Number | Name | Date |
|---|---|---|
| 1,207,331 | Schwartz | Dec. 5, 1916 |
| 1,320,964 | Balog | Nov. 4, 1919 |
| 1,444,304 | Butler | Feb. 6, 1923 |
| 1,547,977 | Vanderveer | July 28, 1925 |
| 1,714,429 | Lewis | May 21, 1929 |
| 2,025,064 | Marsters | Dec. 24, 1935 |

FOREIGN PATENTS

| Number | Country | Date |
|---|---|---|
| 614,842 | France | Sept. 26, 1926 |